Nov. 8, 1966 D. E. ST. JOHN 3,284,641

GATING SYSTEM

Filed Dec. 26, 1963

INVENTOR
Dale E. St. John
By Smyth Roston & Pavitt
Attorneys

United States Patent Office
3,284,641
Patented Nov. 8, 1966

3,284,641
GATING SYSTEM

Dale E. St. John, Rolling Hills Estates, Calif., assignor to Arnoux Corporation, Culver City, Calif., a corporation of California Filed Dec. 26, 1963, Ser. No. 333,463
15 Claims. (Cl. 307—88.5)

The present invention relates to gating networks and systems.

Gating networks and systems usually include diodes which are suitably biased in forward and/or reverse directions. For purposes of such bias, it is necessary to feed a biasing current into the gating network. For a particular signal level, for example, input signal zero, a specific balance is maintained in the gating network. A signal voltage applied to the gating network and having a value different from the aforementioned zero level might distort the initial balance causing some of the biasing current to flow into the signal source. The inner resistance or impedance of the signal source then will produce a voltage drop which is added to or subtracted from the signal voltage proper. Accordingly, the gain through the gating network will differ from unity, causing a distortion of the signal which is being gated through.

The aforementioned problem arises particularly when the gating network has a two-sided biasing system, whereby the biasing current flows into and out of the gating network. The initial balance includes measures to insure that the biasing current flowing into the gating network equals the biasing current flowing out of the gating network, so that no current is being branched off to flow into or out of the signal input and the signal output terminals. A signal voltage applied to the signal input terminal will tend to unbalance the flow of currents, and any current now flowing into or out of the signal voltage input terminal causes a voltage drop across the inner resistance of the signal voltage source, thereby distorting the signal voltage proper.

It is an object of the present invention to eliminate the aforementioned drawbacks and to suppress the development of any branched-off current flowing through the signal input terminal of a gating network.

It is another object of the present invention to maintain a constant transfer characteristic of a gate irrespective of the selected signal voltage level. It is a further object of the present invention to maintain balanced bias in one or more serially operating gates.

Gating networks of the type improved by the present invention will include a diode network establishing a signal input terminal, a signal output terminal, and one or more biasing terminals to which are applied not only gating potentials, but also currents to establish operating biasing levels. Usually a resistor is connected to such a biasing terminal. It is a feature of the present invention to control the current through that resistor in a manner insuring a constant flow of current at the biasing terminal. If two biasing terminals are present in such a gating network, the control means is being operated in that the current inflow and outflow at such biasing terminals is maintained constant throughout the dynamic range of the gate.

It is a further feature of the present invention to control the voltage applied to such an aforedescribed biasing resistor in response to the signal to be gated through such a gate.

According to one aspect of the present invention in a preferred embodiment thereof, a gating system is suggested having a diode bridge with two anode-to-cathode connecting terminals, a cathode-to-cathode connecting terminal, and an anode-to-anode connecting terminal. The latter two terminals serve as biasing terminals, and connected to them are resistances as well as gating diodes. Biasing potentials are being applied to the two resistances. A signal voltage source is connected to one of the anode-to-cathode terminals, whereas the other anode-to-cathode terminal serves as signal output terminal of the gate. The biasing currents flowing through either one of the aforementioned resistors are being maintained at a constant level. Such constant value can be maintained by using control means operating in response to the input signal or the output signal to keep the voltage drops across the two biasing resistors constant throughout the dynamic range as covered by available signal voltages. Alternatively, constant current control means can be connected in series to each of the two biasing resistors.

While the specification concludes with claims particularly pointing out and distinctly claiming the subject matter which is regarded as the invention, it is believed that the invention, the objects and features of the invention, and further objects, features, and advantages thereof will be better understood from the following description taken in connection with the accompanying drawings, in which:

Figure 1:
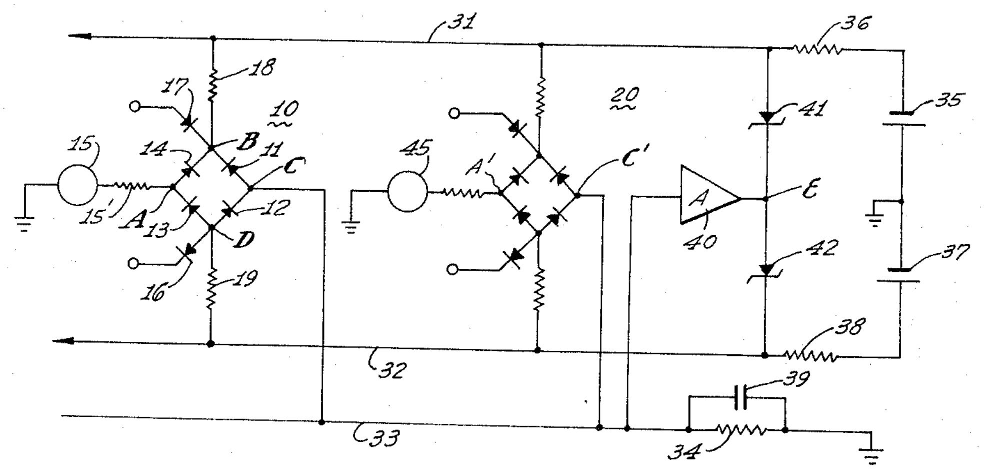
FIG. 1 illustrates a circuit network for several gating networks operating on a common bus.

Proceeding now to the detailed description of the drawing, particularly to FIG. 1, there are shown first and second gates 10 and 30, respectively. Gate 10 includes a rectifier bridge comprised of four diodes 11, 12, 13, and 14. These diodes are interconnected in that diodes 11 and 14 have their respective cathodes interconnected to form a terminal B; diodes 12 and 13 have their respective anodes interconnected to form a terminal D; diodes 11 and 12 have an anode-to-cathode connecting junction C; and diodes 13 and 14 have an anode-to-cathode connecting junction denoted with reference character A. Terminal A constitutes the signal input terminal of the gate. Terminal C is the signal output terminal, and terminals B and D are gating signal control and biasing terminals. As far as the rectifier bridge configuration is concerned, terminals A and C are the A.C. terminals thereof; B is the positive D.C. terminal, and D is the negative D.C. terminal.

A signal source 15 is connected between terminal A and ground. The resistor 15' symbolically illustrates the inner resistance of the signal source. Signal source 15 may supply either A.C. or D.C. pulses, trains of pulses, coded or modulated carriers, etc.

The gating network 10 further comprises a diode 16 connected with its anode to terminal D and with its cathode to a first source of gating potential. There is finally provided a diode 17 connected with its cathode to terminal B and with its anode to another source of gating potential. Gating potentials rendering diodes 16 and 17 conductive close the gate; reverse bias for diodes 16 and 17 opens the gate for passage of signals from terminal A to terminal C.

Two similar biasing resistors 18 and 19 are respectively connected with one terminal each to the terminals B and D, respectively. The respective other terminals of resistors 18 and 19 are connected to voltage supply lines 31 and 32 respectively, furnished with appropriate biasing potentials. Terminal C is further connected to a bus 33, and reference numeral 34 denotes symbolically the load connected between bus 33 and ground. Reference numeral 39 represents the circuit network capacity as it appears at the output side of the gate, particularly the capacitance existing between bus and ground.

Before proceeding to the specific inventive features illustrated in this embodiment, it should be explained to what extent the network as described thus far is susceptible to the production of errors and signal distortions, and it will be explained that the signal gated through gate 10 and coming from source 15 would be distorted if no further measures were provided for.

Assuming, for a moment, that no signal is being developed in source 15 but that the gate is being gated-open, then ground potential is being applied directly to terminal A. Assuming further that a negative voltage of, for example, −20 volts is being applied to line 31 and that a biasing voltage of +20 volts is being applied to line 32, then the rectifier bridge is balanced, and no current is being branched off terminals A and C, but equal currents flow through resistors 18 and 19. It is apparent that this condition can exist only if lines 31 and 32 have opposite and equal potential differences with reference to the particular potential applied to terminal A.

This condition for establishing gate and bridge balance can be restated as follows: The ratio of the voltage between line 31 and either terminal A or terminal C over the resistance of resistor 18 must equal the ratio of the voltage between line 32 and terminal A or terminal C over the resistance of resistor 19, with ground terminal existing at terminal A. Hence, similarity of the resistances of the resistors 18 and 19 is required only if the biasing voltages of lines 31 and 32 relative to ground are opposite and equal, or vice versa. A difference in resistivity of biasing resistors 18 and 19 requires a corresponding and proportional difference between the biasing voltages in order to balance the bridge.

For reasons of simplifying the description, similar biasing resistances and similar biasing voltages are being assumed. It is not intended, however, to restrict the invention to such a specific situation.

It shall be further assumed that the gate is being gated-open so that diodes 16 and 17 are biased to cut off.

If a signal voltage of, for example, +5 volts is now developed by source 15, a voltage drop of 25 volts will appear across resistor 18, and a voltage drop of about 15 volts will appear across resistor 19. For convenience, the voltage drop across each individual diode will be omitted from our discussion. This is permissible because the symmetrical configuration of the bridge does not alter the principal considerations to be made.

The signal voltage unbalances the network 10, and the voltages across the two resistors 18 and 19 now differ by about 10 volts. Accordingly, the currents through these resistors cannot be equal any more. Looking at the gating network 10 as a whole, it can be seen that the difference between the two currents results in branched-off currents flowing through the signal voltage source 15 and the bus 33 with load 34, whereby, of course, the ratio of these branched-off currents follows the inverse ratio of the resistance 15′ and 34. Accordingly, a voltage drop occurs across resistance 15′, so that the signal voltage as it appears at gate output terminal C is the difference between the signal voltage proper and the voltage drop across resistance 15′. Accordingly, the signal gated through gate 10 is not the proper reproduction of the signal developed by signal source 15.

If the impedance of signal source 15 remains constant throughout the entire range of input signal voltage, if the load 34 remains constant, and if the lines 31 and 32 are maintained at constant potentials, then the voltage drop across the source impedance, such as resistance 15′, resulting from the bridge unbalance described will be a linear function of the signal voltage. In this case, the output voltage appearing at terminal C will still be analogous to the input voltage, even though the gain through the gate is not exactly unity. This situation, however, is not the normal case. Normally, the source impedance varies considerably over the signal range, and the gate should not be limited to operate always on a constant load so that the "gating error" is nonlinear. This is a definite drawback, specifically in cases when several gates operate upon a common bus, when the signal sources for each gate differ, and also when the signals themselves differ. The aforedescribed unbalance causes nonuniform signals to appear in the common bus, which is basically undesirable.

In order to remedy the situation, the following additional system is provided.

The line 31 receives its negative potential from a suitable source, for example, a battery 35 having its positive terminal grounded. A resistor 36 is connected between the negative battery terminal and line 31. A similar battery 37 is connected with its negative terminal to ground and with its positive terminal to a resistor 38 having its other side connected to line 32.

There are next provided two Zener diodes 41 and 42 connected in series between lines 31 and 32 and having a common junction E, to which is connected the output side of an amplifier 40 having its input side connected to the signal output terminal C of gate 10. Since in the present embodiment the terminal C connects to a common bus, the amplifier 40 is shown as having its input terminal connected to this bus. It is important, however, that the input signal for amplifier 40 is a signal which is gated through gate 10 and developed at either terminal A or terminal C.

The network as described thus far balances the biasing of the bridge as follows. The voltage developed across each Zener diode remains constant. The battery voltages are selected so that the current permitted to flow through resistors 36 and 38 are sufficiently large for the Zener voltages to remain constant throughout the complete dynamic range of operation. The purpose of the two Zener-regulated power supplies thus established is to provide two such constant voltage drops. Since the two Zener diodes 41 and 42 are connected in series, the lines 31 and 32 are kept at potentials which differ by a constant value.

The amplifier 40 is selected to have a voltage gain which is being set to unity. Only a power gain is required. The power gain provided by the amplifier prevents the loading of the signal source by the biasing currents of the gate. Accordingly, the Zener diodes insure that the voltages between lines 31 and 32, on the one hand, and terminals C and E of amplifier 40, on the other hand, remain constant.

Assuming again that the signal voltage source 15 develops a signal of +5 volts, then these 5 volts, as transmitted through the gate, will appear at terminal C and therefore at the input side of amplifier 40. Since the voltage gain of the amplifier 40 is unity, the same 5 volts will appear at terminal E. Accordingly, the voltage of line 31 will be shifted towards less negative values, and the voltage in line 32 will be shifted towards more positive values. In particular, line 31 will now have a potential of −15 volts, and line 32 will have a potential of +25 volts. Accordingly, the voltage drops across resistors 18 and 19 will be equal again, having a value of 20 volts each. Since the biasing currents through the resistors 18 and 19 are determined by these potentials, these biasing currents remain equal and constant. This restoration of a balanced bias occurs over the entire signal input range because the potential at terminal E faithfully follows the signal developed by source 15. The signal shifts the potentials in lines 31 and 32 for equal amounts and in opposite directions; and this shift in operating biasing level is precisely what is required to restore the balance of currents through resistors 18 and 19. Since the biasing currents remain constant and equal throughout the entire signal range, the gate remains in balance, and no bleeder current flows into the signal input circut. Accordingly, the potential at terminal A faithfully follows the potential developed by signal source 15, and the feed-back action of the amplifier and constant voltage network insures that the potential at terminal C equals that at terminal A and at the output side of signal source 15.

As long as the gate is closed, no problem arises because the diode bridge is then biased to cut off. Also, a signal of ground potential always furnishes ground potential for bus 33 during the gated-open period.

It will be understood that the biasing current flowing to either branch of the bridge must be larger than the signal current, for otherwise not all of the diodes 11 to 14 will be biased in a forward direction. It is desirable to have a relatively large biasing current in order to reduce the forward impedance of the diodes and to improve the linearity of the transmission characteristics of the gate.

In a commutator employing several gates connected to the common bus, the capacity 39 between bus and ground may become large and cause a slow rise time and a slow fall of the output data, a fact which limits the rate of gating and of commutation. The capacity 39 is charged or discharged by the signal source current. However, the signal current cannot exceed the biasing current. Therefore, to provide for large peak signal currents to rapidly change the charge on capacitor 39, a still larger biasing current is required. It will be appreciated that a large biasing current tends to increase the error and the degree of bridge unbalance if the inventive network is not provided.

The network illustrated in FIG. 1 includes a second gate 20 composed of circuit elements similar to those of which gate 10 is comprised. The output terminal C′ of this gate feeds directly into the bus 33; the input terminal A′ receives its signals from a second signal source 45. Since gates 10 and 20 operate alternatingly, the network which includes elements 36, 38, 40, 41 and 42 can also be used to balance gating network 20. Accordingly, the bridge output terminal C′ also connects to the input side of amplifier 40. It will be appreciated that the voltages developed at the input side and at the output side of amplifier 40 to be effective in one gating network do not thereby affect the other gate because this other gate will then be closed.

As described above, the potentials in lines 31 and 32 vary directly with the input signal as developed by any of the input-signal sources. The battery voltages, of course, are fixed. Accordingly, the voltages across resistors 36 and 38 vary. The variations of the current in resistors 36 and 38 are oppositely directed, and accordingly the currents through the Zener diodes will vary and also in opposite directions. It should not be forgotten that a Zener diode has a voltage-current characteristic which furnishes a substantially, but not completely, constant voltage for a particular current range. Hence, a variation in current through the Zener diode will still result in a slight voltage change. In the present embodiment, this voltage change might be noticeable, since the currents through the Zener diodes vary in opposite directions during any signal.

Figures 2, 3:
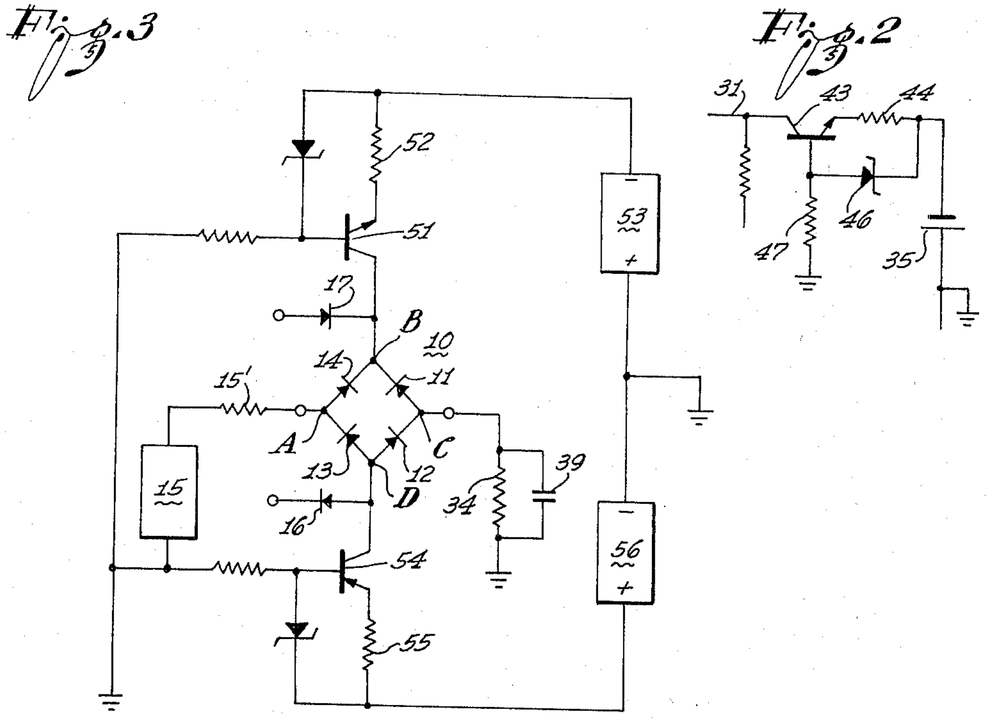
FIG. 2 illustrates a modification for the network shown in FIG. 1.
FIG. 3 illustrates a second embodiment for a single gating network.

In order to compensate for this small error in Zener voltage, each of the resistors 36 and 38 might be replaced by a network shown in FIG. 2. There is provided a transistor 43 connected in series with an emitter-biasing resistor 44 having its other side connected to one pole of one of the batteries, for example, battery 35. A Zener diode 46 is connected across the base-emitter path of transistor 43 and the resistor 44. A resistor 47 connects the base electrode to ground.

It will be appreciated that the collector current of transistor 43 is maintained at a constant value, irrespective of any variations in collector potential. The collector of transistor 43 is connected to line 31 accordingly, so that the current line 31 remains constant throughout the operation and regardless of variations of potential of line 31. The current of a resistor such as 18 flows into the line 31 but is constant due to the aforedescribed operation. Line 31 obtains additional current only through Zener diode 41. Accordingly, the current through the latter diode is maintained at a constant value. Line 32 is governed by an arrangement similar to that shown in FIG. 2, with the exception that the transistor is to be of the NPN type.

It will be appreciated that constant voltage elements other than Zener diodes can be used to maintain lines 31 and 32 at constant potentials. For example, gas tubes such as thyratrons can well be employed as constant-voltage regulating elements. Such constant-voltage regulating elements in connection with the amplifier 40 serve to impress constant and equal voltage values across the two biasing resistors 18 and 19.

It will be recalled that, in the above-described embodiment, the resistors 18 and 19 had equal values because the potentials of lines 31 and 32 were equal and opposite relative to a reference potential such as ground. If the voltage between ground and line 31 intentionally differs from the voltage between ground and line 32 and if the resistors 18 and 19 differ from each other at a similar ratio, then the bridge will still be balanced, and a readjustment is required and possible to maintain constant voltage drops across each biasing resistor. Similarity or dissimilarity of the resistances 18 and 19 is critical only for purposes of selecting proper biasing voltages in lines 31 and 32, in order to balance the gating network initially at a reference potential during the gating-open period. The restoration of current balance is then carried out in "tacking on" the signal voltage as developed at terminal A at the sides of resistors 18 and 19 not connected to the rectifier bridge. These "tacked on" voltages are similar for both resistors regardless of their resistive values.

It should not be forgotten that the principal object of the invention is to insure that all of the biasing current flowing into a gating network and its bridge at terminal D will flow out of the bridge again at terminal B. The constant-voltage means must be adjusted and dimensioned to insure that a bridge balanced for a zero voltage remains balanced throughout the dynamic range of applied signals. In other words, the constant-voltage means used will serve to maintain individually the voltage drop across resistor 18 and the voltage drop across resistor 19, so that the currents flowing into and out of the rectifier bridge are equal. Whether or not, in such a situation, the voltages across resistors 18 and 19 are similar is not critical, but dissimilar voltages can, of course, individually be kept at constant values through corresponding constant voltage means.

Keeping the foregoing in mind, the modified embodiment illustrated in FIG. 3 can easily be understood. Again there is shown a gating network 10, comprised of diodes 11, 12, 13, and 14 which are interconnected to establish terminals A, B, C, and D that correspond to those described with reference to FIG. 1. There is also provided a signal source 15 having an inner impedance source 15′, and there is a load resistor 34.

Terminal B of the gating network 10 is connected in series with the emitter-collector path of an NPN transistor 51 having its emitter connected through a biasing resistor 52 to the negative terminal of a voltage source 53. This voltage source 53 may also be a battery. The positive terminal of source 53 is grounded. The terminal D of the gating network 10 is connected to the collector of a PNP transistor 54 having its emitter-electrode connected through a resistor 55 to the positive terminal of a voltage source 56. The negative terminal of a voltage source 56 is also grounded.

It may be assumed that the voltage sources 53 and 56 are similar. The resistors 52 and 55 are also similar. However, minor differences may be introduced to accommodate any differences in the characteristics of the two complementary transistors 51 and 54.

The base electrode of each of the transistors is resistively connected to ground and biased individually by a Zener diode. Accordingly, the collector currents of the transistors 51 and 54 are being adjusted to equal values.

The constant-current characteristics of such transistors insure that the current flowing into terminal D always equals the current flowing out of terminal B, regardless of the development of differing potentials at terminal A. Of course, the voltages furnished by the sources 53 and 56 must be large enough so that the bias applied to either transistor is sufficient to maintain a constant biasing current throughout the full input-signal range. The biasing current is also set to a value which accommodates the desired peak signal current to rapidly charge and discharge the load capacity 39.

Considering the disclosure of the embodiment shown in FIG. 3, it might appear that the employment of such transistors would render the Zener diodes 41 and 42 and the amplifier 40 in FIG. 1 superfluous if the latter network were supplemented by transistor networks as shown in FIG. 2. However, it must be emphasized that a network of FIG. 1, with or without a supplemental network as shown in FIG. 2, restores the balance of a plurality of serially operating gates, whereas in FIG. 3 the balance is being restored by means serving only one gate.

Looking at the various embodiments disclosed, it will be appreciated that similarity of currents flowing into and out of the gate at terminals D and B thereof can be enforced, either by controlling these currents to equal and constant values or by controlling the voltage across the gate-biasing resistors to maintain constant values.

The invention is not limited to the embodiments described above, but all changes and modifications thereof not constituting departures from the spirit and scope of the invention are intended to be covered by the following claims.

What is claimed is:

1. A gating system comprising:
a diode bridge having two A.C. and two D.C. terminals;
a signal source connected to a point of reference potential and to one of said A.C. terminals, the other one of said A.C. terminals defining the output terminal of the gate;
a gating diode connected with its anode to the positive one of said D.C. terminals;
a second gating diode connected with its cathode to the negative one of said D.C. terminals;
a source of positive and a source of negative biasing potentials having a common return terminal connected to said point of reference potential;
two resistances respectively connecting said D.C. terminals to said sources of biasing potentials at a polarity to forward bias said diode bridge; and
means connected to said signal source and to said resistances for maintaining therein constant and equal currents when the bridge is forward biased for transmitting signals from said signal source to said output terminal.

2. A gating system comprising:
a diode bridge having two A.C. and two D.C. terminals;
a signal source connected to a point of reference potential and to one of said A.C. terminals, the other one of said A.C. terminals defining the output terminal of the gate;
a gating diode connected with its anode to the positive one of said D.C. terminals;
a second gating diode connected with its cathode to the negative one of said D.C. terminals;
a source of positive and a source of negative biasing potentials having a common return terminal connected to said point of reference potential;
two resistances respectively connecting said D.C. terminals to said sources of biasing potentials at a polarity to forward bias said diode bridge; and
a constant current circuit element connected in series with each of said resistances.

3. A gating system comprising:

a diode bridge having two A.C. and two D.C. terminals;
a signal source connected to a point of reference potential and to one of said A.C. terminals, the other one of said A.C. terminals defining the output terminal of the gate;
a gating diode connected with its anode to the positive one of said D.C. terminals;
a second gating diode connected with its cathode to the negative one of said D.C. terminals;
a source of positive and a source of negative biasing potentials having a common return terminal connected to said point of reference potential;
two resistances respectively connecting said D.C. terminals to said sources of biasing potentials at a polarity to forward bias said diode bridge;
a pair of complementary-type transistors respectively connected in series with each of said resistances; and
constant voltage biasing means connected across the base-emitter path of each of said transistors.

4. A gating system comprising:
a diode bridge having two A.C. and two D.C. terminals;
a signal source connected to one of said A.C. terminals, the other one of said A.C. terminals defining the output terminal of the gate;
a gating diode connected with its anode to the positive one of said D.C. terminals;
a second gating diode connected with its cathode to the negative one of said D.C. terminals;
a source of positive and a source of negative biasing potentials;
first and second resistors respectively connected with one terminal each to said sources of biasing potentials;
two constant voltage circuit elements connected in series and across the two other terminals of said resistors, and having a common junction;
a third resistor interconnecting said first resistor and said positive D.C. terminal;
a fourth resistor interconnecting said second resistor and said negative D.C. terminal; and
an amplifier having unity voltage gain and interconnecting the output terminal of the gate and said junction.

5. A gating system comprising:
a diode bridge having two A.C. and two D.C. terminals;
a signal source connected to one of said A.C. terminals, the other one of said A.C. terminals defining the output terminal of the gate;
a gating diode connected with its anode to the positive one of said D.C. terminals;
a second gating diode connected with its cathode to the negative one of said D.C. terminals;
a source of positive and a source of negative biasing potentials;
first and second resistors respectively connected with one terminal each to said sources of biasing potentials;
a pair of Zener diodes interconnected for similar direction of conduction and being connected across the two other terminals of said resistors, thereby defining a common junction of intermediate potential;
a third resistor interconnecting said first resistor and said positive D.C. terminal;
a fourth resistor interconnecting said second resistor and said negative D.C. terminal; and
an amplifier having unity voltage gain and interconnecting the output terminal of the gate and said junction.

6. In a gating system, the combination comprising:
a diode network having signal input and output terminals;
signal means connected to said signal input terminal and having a return terminal;

resistive means connected for biasing said diode network in the forward direction for conduction and having a common return connected to said return terminal of said signal means; and means for maintaining a constant biasing current inflow and current outflow from said resistive means at said diode network while said diode network is biased for conduction.

7. In a gating network, the combination comprising:

a diode gating network having signal input, signal output, and biasing terminals;

a resistor connected with one of its terminals to said biasing terminal; and means for establishing a potential at the other resistor terminal having polarity to bias said diode gating network in the forward direction and including means for varying the potential in response to a signal at said signal terminals.

8. A gating system comprising:

a diode bridge having two A.C. and two D.C. terminals;

a single source connected to a point of reference potential and to one of said A.C. terminals, the other one of said A.C. terminals defining the output terminal of the gate;

a gating diode connected with its anode to the positive one of said D.C. terminals;

a second gating diode connected with its cathode to the negative one of said D.C. terminals;

a source of positive and a source of negative biasing potentials having a common return terminal connected to said point of reference potential;

two resistances respectively connecting said D.C. terminals to said sources of biasing potentials at a polarity to forward bias said diode bridge; and means connected to said resistances for maintaining a constant voltage across each of them when said diode bridge is biased in the forward direction.

9. A gating system comprising:

a diode bridge having two A.C. and two D.C. terminals;

a signal source connected to one of said A.C. terminals, the other one of said A.C. terminals defining the output terminal of the gate;

a gating diode connected with its anode to the positive one of said D.C. terminals;

a second gating diode connected with its cathode to the negative one of said D.C. terminals;

two similar resistors, respectively connected with one terminal each to said D.C. terminals;

a source of positive and a source of negative biasing potentials, respectively connected to the other terminals of said resistors; and means for varying the potentials at said other terminals of said resistors in like directions and in response to the voltage applied by said signal source.

10. A gating system comprising:

a diode bridge having two A.C. and two D.C. terminals;

a signal source connected to one of said A.C. terminals, the other one of said A.C. terminals defining the output terminal of the gate;

a gating diode connected with its anode to the positive one of said D.C. terminals;

a second gating diode connected with its cathode to the negative one of said D.C. terminals;

two similar resistors, respectively connected with one terminal each to said D.C. terminals;

a source of positive and a source of negative biasing potentials, respectively connected to the other terminals of said resistors;

a pair of constant voltage elements connected in between said other terminals of said resistors and defining a common junction; and means for feeding the voltage applied to one of said A.C. terminals to said common junction.

11. A gating system comprising:

a diode rectifier bridge having two anode-to-cathode connecting terminals, a cathode-to-cathode and an anode-to-anode connecting terminal;

means defining a constant potential reference terminal;

two resistances respectively connected to said cathode-to-cathode and said anode-to-anode terminals;

means for applying biasing potentials to said resistance, the biasing potentials being oppositely poled in relation to said potential; and means for maintaining the electric currents through said resistances at equal value, said currents having direction of flow to bias said diode rectifier into conduction.

12. A gating system comprising:

a diode rectifier bridge having two anode-to-cathode connecting terminals, a cathode-to-cathode and an anode-to-anode connecting terminal;

gating diodes connected to said cathode-to-cathode and said anode-to-anode terminals;

a source of positive and a source of negative biasing potentials having a common return terminal;

a first and a second similar resistor;

first constant current control means respectively interconnecting said first resistor, said cathode-to-cathode terminal, and said source of negative potential;

second constant current control means interconnecting said second resistor, said anode-to-anode terminal, and said source of positive potential; and signal means connected between one of said two anode-to-cathode terminals and said return terminal.

13. A gating system comprising:

a plurality of gating networks, each including a diode rectifier bridge having two anode-to-cathode connecting terminals, a cathode-to-cathode and an anode-to-anode connecting terminal, gating diodes connected to said cathode-to-cathode and said anode-to-anode terminals, and including two resistances respectively connected to said cathode-to-cathode and said anode-to-anode terminals;

a source of positive and a source of negative biasing potentials;

two resistances respectively connected to said sources of biasing potentials;

a pair of constant voltage elements connected in series and interconnecting said latter two resistances, thereby forming three terminals for three different constant voltage potentials;

coupling means for connecting the output terminals of each of said gating networks to that one of said three terminals having the intermediate potential; and means for connecting the resistances of said gating networks to the other two of said three constant potential terminals.

14. A gating system comprising:

a plurality of gating networks, each including a diode rectifier bridge having two anode-to-cathode connecting terminals, a cathode-to-cathode and an anode-to-anode connecting terminal, gating diodes connected to said cathode-to-cathode and said anode-to-anode terminals, further including two resistances respectively connected to said cathode-to-cathode and said anode-to-anode terminals;

a source of positive and a source of negative biasing potentials;

two resistances respectively connected to said sources of biasing potentials;

a pair of Zener diodes connected in series and interconnecting said latter two resistances, thereby forming three terminals for three different constant voltage potentials;

coupling means for connecting the output terminals of each of said gating networks to that one of said three terminals having the intermediate potential; and means for connecting the resistances of said gating networks to the other two of said three constant potential terminals.

15. In a gating network, the combination comprising:
a diode-type gate having signal input, signal output, and biasing terminals;
a resistor connected to said biasing terminal; and
means for applying biasing potential to said resistor having polarity to bias said diode gating network in the forward direction and including means for varying the potential in response to the signals to be gated through said diode gate.

References Cited by the Examiner

UNITED STATES PATENTS

| | | |
|---|---|---|
| 2,990,477 | 6/1961 | MacIntyre. |
| 3,011,129 | 11/1961 | Magleby et al. |
| 3,052,851 | 9/1962 | Heberling. |
| 3,075,086 | 1/1963 | Mussard. |
| 3,114,872 | 12/1963 | Allard. |
| 3,160,763 | 12/1964 | Carney. |
| 3,201,641 | 8/1965 | Thorne. |

ARTHUR GAUSS, *Primary Examiner.*

D. D. FORRER, *Assistant Examiner.*